United States Patent
Lal et al.

(10) Patent No.: US 7,580,682 B2
(45) Date of Patent: Aug. 25, 2009

(54) METHOD AND APPARATUS FOR COMPREHENSIVE LINK ASSESSMENT AND FREQUENCY MONITORING IN WIRELESS SENSOR NETWORKS

(75) Inventors: Dhananjay Lal, Palo Alto, CA (US); Abtin Keshavarzian, Palo Alto, CA (US)

(73) Assignee: Robert Bosch GmbH, Stuttgart (DE)

(*) Notice: Subject to any disclaimer, the term of this patent is extended or adjusted under 35 U.S.C. 154(b) by 676 days.

(21) Appl. No.: 11/293,491

(22) Filed: Dec. 2, 2005

(65) Prior Publication Data
US 2007/0129011 A1   Jun. 7, 2007

(51) Int. Cl.
*H04B 17/00* (2006.01)
(52) U.S. Cl. ............... 455/67.13; 455/67.11; 455/452.1; 455/452.2; 455/507; 455/509; 455/513; 455/561; 455/161.1; 455/161.3; 370/252; 370/329; 370/332; 709/224; 709/226
(58) Field of Classification Search ......... 455/436–451, 455/452.1–2, 455, 464, 500–502, 507, 516, 455/67.11, 67.13, 71, 161.1–3, 164.1–2, 455/166.1–2, 179.1, 182.1–2, 226.1–3, 561; 370/329–338, 252; 709/223–226
See application file for complete search history.

(56) References Cited

U.S. PATENT DOCUMENTS

| | | | |
|---|---|---|---|
| 5,594,949 A | * | 1/1997 | Andersson et al. .......... 455/437 |
| 6,675,012 B2 | * | 1/2004 | Gray ......................... 455/423 |
| 7,048,900 B2 | * | 5/2006 | Mathur et al. ............... 423/331 |
| 7,092,672 B1 | * | 8/2006 | Pekonen et al. .......... 455/67.11 |
| 7,164,916 B1 | * | 1/2007 | Ahnlund et al. ............. 455/437 |
| 7,440,423 B2 | * | 10/2008 | Stephens ..................... 370/280 |

FOREIGN PATENT DOCUMENTS

| | | | |
|---|---|---|---|
| GB | 2350976 | * | 12/2000 |
| WO | WO 00/78062 A2 | | 12/2000 |

OTHER PUBLICATIONS

Almgren M. et al., "Slow Adaptive Channel Allocation for Automatic Frequency Planning", International Conference on Universal Personal Communications, IEEE, New York, NY, US, Sep. 29, 1996, pp. 260-264, XP002055382.

* cited by examiner

*Primary Examiner*—Tuan A Tran
(74) *Attorney, Agent, or Firm*—Courtney Staniford & Gregory LLP

(57) ABSTRACT

Embodiments of a link assessment and frequency monitoring system for use in wireless sensor networks are described. In one embodiment, each frequency utilized by links coupling two or more nodes in the network is sampled to determine a noise measure for each frequency. A correlation measure based on the distance between the noise measures for each pair of frequencies is determined. The frequencies are then clustered into a number of groups of frequencies based on the correlation measure between each pair of frequencies, such that the number of groups is less than the total number of frequencies. A representative frequency for each group of frequencies is selected, and a link quality assessment for each pair of nodes in the network is performed for the representative frequency of each group of frequencies.

21 Claims, 4 Drawing Sheets

|   | A | B | C | D | E | ... | Y |
|---|---|---|---|---|---|---|---|
| 1 | 5 | 4 | 3 | ... | ... | ... | ... |
| 2 | 6 | 10 | 5 | ... | ... | ... | ... |
| 3 | 5 | 2 | 4 | ... | ... | ... | ... |
| 4 | 3 | 3 | 2 | ... | ... | ... | ... |
| 5 | 1 | 8 | 3 | ... | ... | ... | ... |
| 6 | 9 | 7 | 9 | ... | ... | ... | ... |
| ⋮ | ⋮ | ⋮ | ⋮ | ⋮ | ⋮ | ⋮ | ⋮ |
| X | ... | ... | ... | ... | ... | ... | ... |

# METHOD AND APPARATUS FOR COMPREHENSIVE LINK ASSESSMENT AND FREQUENCY MONITORING IN WIRELESS SENSOR NETWORKS

FIELD

Embodiments of the invention relate generally to equipment networks, and specifically to assessing and monitoring links in wireless networks.

BACKGROUND

Wireless sensor networks are typically comprised of large numbers (e.g., hundreds to thousands) of nodes that collectively perform tasks such as environment monitoring, motion detection, surveillance, and so on. Each node is a low power device, typically battery-operated, that is equipped with one or more sensors and a low power radio. The network is often expected to operate for a number of years without refreshing the batteries in the nodes. In typical operation, the nodes periodically sense their environment, and communicate with their peers using predefined transmission protocols. In order to achieve long battery life, the node hardware and transmission protocols must be designed to ensure extremely low average current draw and conform to an energy budget that gives low time rates of power consumption per node.

The communication links between wireless sensor nodes in a network typically utilize one or more unlicensed frequency bands (channels), or frequency bands specifically designated for the particular network application. In general, any number of sensor networks may operate simultaneously, which is possible primarily because each node usually communicates over short-range links and the principle of spatial reuse allows many adjoining networks to operate with tolerable interference from one another. Nevertheless, accommodating for the effects of interference is a critical issue with regard to the proper time and energy-efficient operation of the network.

In a static topology formation, it has been observed that certain wireless channels have better signal-to-interference-noise (SINR) than others, and are thus more tolerant to sudden interference effects. Moreover, certain wireless channels that may not be significantly affected by interference operate on better signal strength reception than others, and are therefore more resistant to fading than others. In most network applications, there may be several options of links (routes) available to the nodes for topology formation. Networks can often be dynamically reconfigured to ensure that the links comprising the node routes are more resistant to interference and/or fading, thus yielding a more efficient topology formation in the long run as fewer packets are lost and fewer retransmissions are required. The choice of a bad link can drain the energy of a node substantially by requiring useless data transmission cycles. Therefore, it is of great importance to assess the SINR of the channels in a sensor network to ensure the utilization of superior links between nodes to maximize the power efficiency of the network.

Present methods of link assessment typically sample each channel of the network in the absence of a signal to determine the ambient noise present in the channel. However, a drawback to this scheme is that while it indicates the interferer noise power present in a frequency band, it does not provide any real information about the usability of a link since this depends on the actual signal-to-interference-noise experienced by the receiver. The actual quality of a link is a function of both the relative placement of transmitter and receiver (the spatial model), as well as the communication frequency. If a localized interferer exists in a certain part of the network, then this information must be encapsulated in the determination of link quality. The consideration of both frequency and spatial quality is especially important for scheduling transmission-reception along different links while choosing from all available frequencies for each link, in order to maximize the simultaneous communication at a given time-slot. Therefore, present methods of link assessment are disadvantageous because they do not consider the link to be a function of the frequency, but only a parameter that encapsulates the received signal-to-noise ratio that occurs due to spatial placement of the receiver with respect to the transmitter.

An additional disadvantage of present link assessment methods involves the time required to complete one cycle of assessment for all links in the network on a given frequency. Present methods typically assess all frequencies for all links in a given network, therefore, the total time required for this operation can be quite significant. The per-cycle time ($T_{cycle}$), is the time required to give reasonably stable time averages of link quality based on Packet Success Rate (PSR) on each link. If there are n adjacent frequency channels available for use in the unlicensed band, then the total time taken for evaluating the link quality of all links for all frequencies is $T_{total}=n*T_{cycle}$. A linear increase on the total time with number of frequency channels is redundant and possibly unacceptable since the initialization steps of node discovery and link assessment must generally form a negligible part of the total energy budget, and must also be carried out within reasonable time periods.

BRIEF DESCRIPTION OF THE DRAWINGS

Embodiments of the present invention are illustrated by way of example and not limitation in the figures of the accompanying drawings, in which like references indicate similar elements and in which:

FIG. 3 illustrates an example of correlation values for a set of hypothetical links in a network, according to an embodiment.

DETAILED DESCRIPTION

Embodiments of a link assessment and frequency monitoring system for use in wireless sensor networks are described. In one embodiment, the operations of link assessment and frequency monitoring are combined during a network initialization process so that all links in a wireless sensor network are monitored with respect to all frequencies in a time and energy efficient manner. The concept of link assessment is thus extended to incorporate multiple frequency channels and represents an important practical enhancement for commercial systems that can operate in multiple frequency bands. Transmission channels between the network nodes are correlated based on the noise conditions, and the actual packet success rate on all frequencies is predicted by sampling the packet success rate on a fewer number of frequencies than the maximum number of possible frequencies. The method according to embodiments produces reasonably accurate information about frequency channels through correlation while utilizing minimum energy and expending little time.

In the following description, numerous specific details are introduced to provide a thorough understanding of, and enabling description for, embodiments of a link assessment and frequency monitoring system for a wireless sensor network. One skilled in the relevant art, however, will recognize that these embodiments can be practiced without one or more of the specific details, or with other components, systems, and so on. In other instances, well-known structures or operations are not shown, or are not described in detail, to avoid obscuring aspects of the disclosed embodiments.

The nodes of a wireless sensor network are usually laid out statically (in fixed positions), either randomly or in a predetermined pattern, depending upon the application in which the sensors are used. Once placed, the nodes set up a communication topology to communicate with each other, either through self-determination or through external assignment. In many cases, the communication topology is a tree structure with a root node (or "base station") that provides an interface to a user or outside network. A network initialization process is typically carried out only once during the life of the network and includes the steps of node discovery and link assessment to establish the most energy-efficient topology for network communication.

Figure 1:
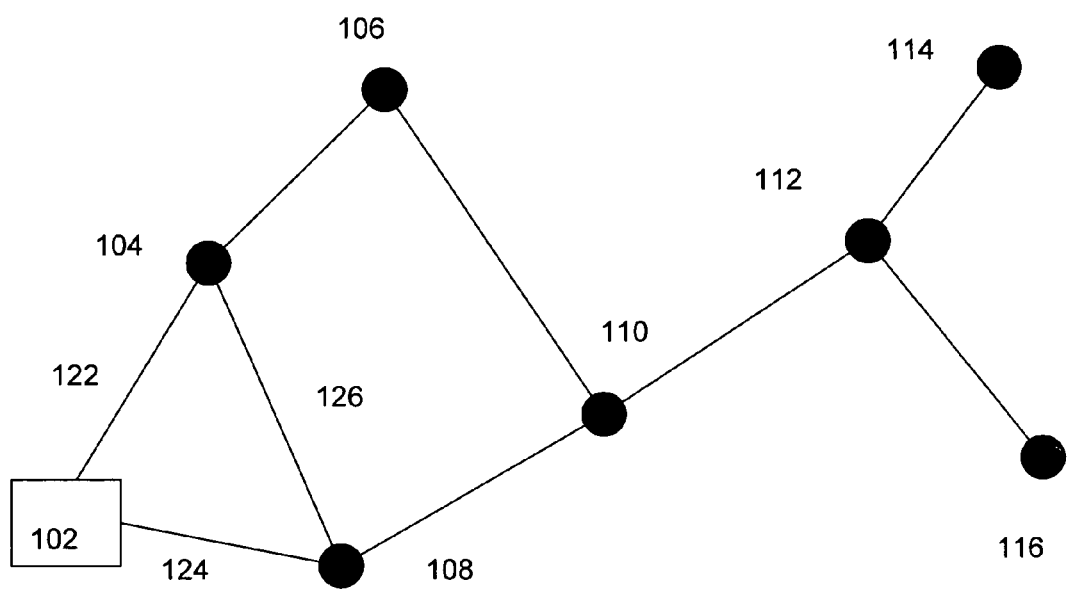
FIG. 1 illustrates a wireless sensor network that implements link assessment and frequency monitoring, according to an embodiment.

FIG. 1 illustrates a wireless sensor network 100 that implements link assessment and frequency monitoring, according to an embodiment. Network 100 comprises a base station 102 coupled directly or indirectly to a plurality of sensors (nodes) denoted nodes 104 to 116. The connecting lines in FIG. 1 represent the communication links between the nodes. Thus, as illustrated for system 100, base station 102 communicates to node 104 over link 122, and to node 108 over link 124. Likewise, node 104 communicates to node 108 over link 126, as well as over links 122 and 124 (through base station 102), and so on. For the embodiment illustrated in FIG. 1, it is assumed that each node is a statically-positioned, low power sensor device that communicates with the other nodes through wireless communication. The low power communication between devices dictates that the wireless sensor nodes use low power communication links. Typically the communication radios employed in each node transmit with low power, such as 0 dBm, i.e., 1 mW, and have good receiver sensitivity for picking data from the air. In general, the wireless channels yield satisfactory yield (close to 100% Packet Success Rate) when the received signal lies above the sensitivity threshold and the difference between the signal and interference exceeds the required signal-to-interference-noise (SINR) threshold.

For the embodiment illustrated in FIG. 1, a number of different frequency channels may be available for communication between each pair of linked network nodes. Thus, network 100 comprises a total number X of nodes communicating over a number Y of frequency channels. Interference problems may cause the loss of packets transmitted among the nodes. In this case, the affected nodes must re-transmit the lost packets in order to ensure valid data transmission. Interference may be caused by sources in proximity to the network and/or by random events or deliberate action. Within any given network, some nodes may be more or less affected by interference than the other nodes. Additionally, each frequency or set of frequencies may have a specific type of interference occurring for that frequency or set of frequencies.

In one embodiment, the wireless sensor network 100 implements a link assessment protocol that is executed during network initialization to verify the quality of the wireless links using an average rather than instantaneous metric, while neighbor node discovery is being performed. This information is used to form the most energy-efficient topology for actual communication. In a static network, it is generally true that a long-term energy-efficient topology exists, and once established, this topology is used in a recurring manner. Since the initialization procedure is carried out once during the lifetime of a network, and generally does not form a significant part of the energy budget, a maximum possible amount of information is available to the sensor nodes and the root node for optimum topology construction.

The network 100 may further implement a protocol that monitors the state of all available frequency channels and switches to a channel that is least affected by interference, whenever possible. Choosing the best frequency of operation has a critical impact on the network performance, especially with regard to the energy consumption of the individual nodes. The optimum frequency operation information is incorporated in the link assessment operation and is also determined during initialization. In one embodiment, the network initialization operation includes functions that perform both link assessment as well as frequency monitoring orthogonally such that information about optimum links and frequency channels is collected and combined. The network operator can thus ascertain the performance of each link for all available frequencies without performing link assessment operations on each and every frequency channel.

In general, schemes for time-slot assignment in order to attain a minimum number of collision-free time slots between any two links include deterministic methods, such as using Optical Orthogonal Codes, or probabilistic guarantees for attaining the required number of collision-free time-slots between any two neighboring nodes. In one embodiment, an underlying link assessment mechanism is used that guarantees that the nodes transmit and receive a sufficient number of packets to allow them to discover their neighbors, and to estimate an average link quality. A measure of time-average link quality, the link inefficiency, is a reciprocal of the packet success rate (PSR) calculated over a certain window of packets, and may be refined using the received SINR value. In one embodiment, it is assumed that the packet success rate is used as a link quality measure. The link quality measure can also factor in the SINR, such that the link quality is a composite of PSR and SINR, with the PSR factor as the main component. In general, SINR provides a measure of the instantaneous quality of a link, and using SINR alone is inherently unreliable as it can only be observed over successfully received packets. The packet success rate provides a measure of the average quality, and is used in order to provide a meaningful value for the application, and to eliminate the influence of factors such as non-linearity in the received signal strength indicator circuitry of a node, which can cause different noise readings at different nodes for the same experienced interference noise.

For a system such as that illustrated in FIG. 1, it can be assumed that the nodes within the network are placed randomly. For this embodiment, the nodes first collect the link quality information and then communicate this information to the base-station using a rudimentary mechanism like CSMA (Carrier Sense Multiple Access) protocols, though other protocols may also be used. The base-station is typically not power constrained, hence it computes the topology based on the information received and then propagates the result back to the nodes. After receiving the topology assignments, the nodes can begin functional operation.

In one embodiment, it is further assumed that the signal strength seen by a receiver on a link in a frequency band comprised of a number of channels is independent of the actual frequency channel used. This assumption generally holds true for narrowband channels where the coherence bandwidth is large enough to accommodate numerous channels, thus providing a flat-fading environment across all available channels. For wider channels, this assumption is also reasonable when the channel bandwidth is much smaller than the center frequency of operation. In any event, it should be noted that the network 100 may be any network in which the attenuation characteristics of the frequency bands are the same or generally similar to each other.

Figure 2:
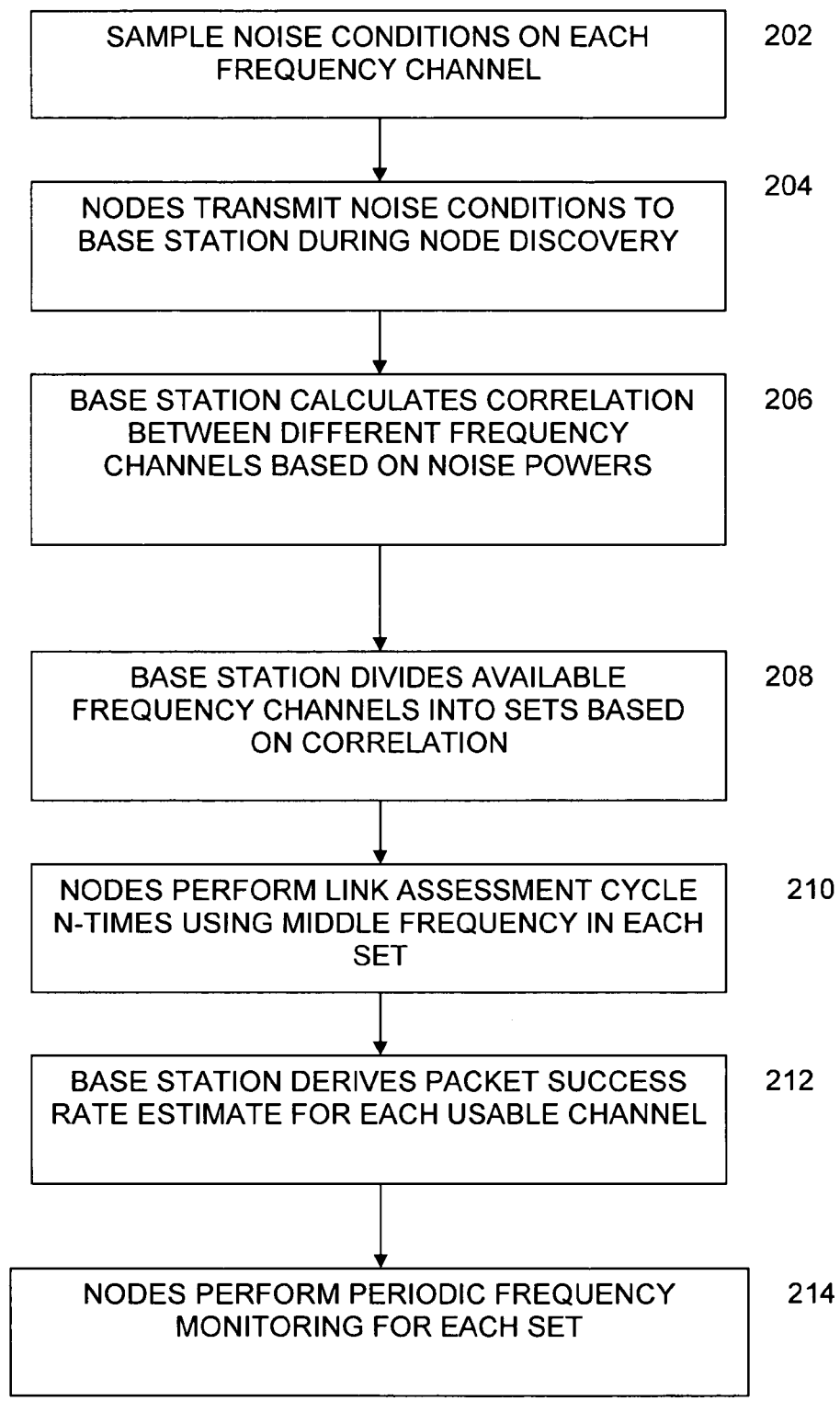
FIG. 2 is a flowchart that illustrates a method of performing link assessment and frequency monitoring, according to an embodiment.

FIG. 2 is a flowchart that illustrates a method of performing link assessment and frequency monitoring, according to an embodiment. The process begins by each node sampling the noise conditions on each frequency channel for the link or links connected to it, 202. In general, there is no communication between the nodes at this point, and the nodes sample each channel in the absence of a signal to determine the ambient noise present in the channel. Noise sampling is achieved by measuring the power on a circuit such as a Received Signal Strength Indicator (RSSI) circuit. The nodes maintain estimates of the average noise power experienced on each available frequency channel. This noise condition information is then passed to the base-station during a node discovery operation 204. The node discovery operation, which is part of the network initialization process, determines the links (e.g., links 122 and 124 of FIG. 1) that are present in the network.

As shown in 206, the base station calculates an index to determine the correlation between the different frequency channels based on the average noise powers determined by the nodes. Two frequency channels are said to be correlated if the noise level measurements at the two channels are close across all sets of nodes in the network. In other words, the correlation index indicates to the base station which frequencies are almost exactly alike with respect to noise conditions. For example, if there is a localized interferer that affects only a few nodes, then for all of these nodes, all the frequency channels that are adversely affected by the interferer will have higher noise power. This will yield higher correlation between the frequency channels that are affected by the same interferer.

In one embodiment, a vector distance function is employed to compute the correlation index between two frequency channels. For example, the following two vectors show the noise levels of all n nodes at two frequency channels, $f_1$ and $f_2$:

$$\overrightarrow{N^{(f_1)}} = (N_1^{(f_1)}, N_2^{(f_1)}, \ldots, N_n^{(f_1)}), \overrightarrow{N^{(f_2)}} = (N_1^{(f_2)}, N_2^{(f_2)}, \ldots, N_n^{(f_2)}),$$

For the above equations, $N_k^{(f)}$ denotes the noise level of node k at frequency channel f. In order to find an index which shows how close these two vectors are, the $L_p$ norm function is used:

$$d_p(f_1, f_2) = \left\| \overrightarrow{N^{(f_1)}} - \overrightarrow{N^{(f_1)}} \right\|_p \triangleq \left[ \sum_{k=1}^{n} \left| N_k^{(f_1)} - N_k^{(f_2)} \right|^p \right]^{1/p}, 1 \le p \le \infty$$

For p=1, the above distance function simply adds all the absolute differences between the noise levels in two frequencies. As p increases, more emphasis is given to the nodes that have larger difference. In the limit where p approaches infinity, the above norm function simply reduces to finding the maximum absolute difference among all nodes:

$$d_\infty(f_1, f_2) = \max_{k=1,\ldots n} \left| N_k^{(f_1)} - N_k^{(f_2)} \right|$$

Once the correlation indexes based on the frequency distance values have been determined, the base station then divides the available frequency channels into sets based on the correlation by performing a clustering operation, 208. That is, frequencies that experience similar noise (at each node, and also for all the nodes cumulatively) are grouped into the same set. The number of sets is determined by the ratio: $N_{set} = T_{total}$ (max. allowable)/$T_{cycle}$. The value of $N_{set}$ defines the maximum number of frequency channels in which the system has sufficient time to perform the link assessment. In general, the larger the number of allowable sets, the more accurate will be the link assessment measure across the different frequencies. The limiting case is that each frequency can be placed in a different set, in which case the correlation need not be performed at all. In general, if the distance between two frequency channels is small, that is, below a pre-determined threshold value, the two frequency channels are considered to be highly correlated. Thus, the correlation index is inversely proportional to the distance.

In one embodiment, the link assessment operation is performed on only one frequency of any group of highly correlated frequencies, thus reducing the number of link assessment operations performed on the entire network. Thus, as shown in 210, the base station directs the nodes to carry out the link assessment cycle $N_{set}$ times, using the middle-most frequency channel in each set, 210. It then extrapolates the performance of all frequencies in a set to be the same, and derives a packet success rate estimate for each usable channel, 212.

By using the information about the noise levels, a number $N_{set}$ of frequencies for which the system performs the link assessment operation is determined. In general, this number will be less than the maximum number of frequencies available in the network, thus reducing the total time required to perform link assessment. By using the abstract concept of distance between two frequencies, this problem reduces to a clustering problem, in which, given a set of points (frequencies) with a proper distance defined between any two pair of points, the points are arranged into $N_{set}$ groups such that the points that are in the same group are as close as possible to each other.

Figure 4:
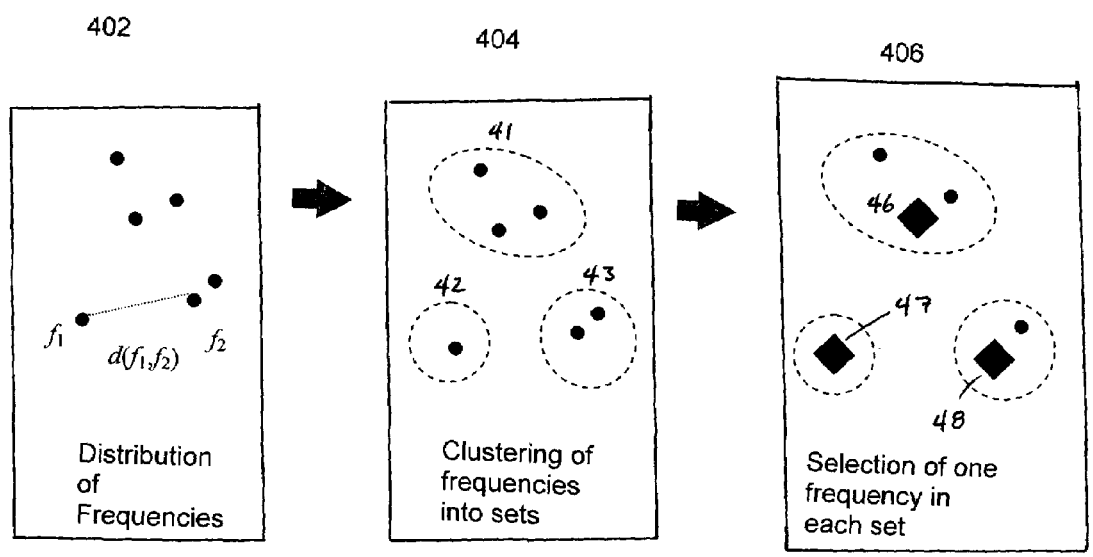
FIG. 4 illustrates an example of a frequency clustering for a link assessment operation, according to an embodiment.

FIG. 4 illustrates an example of a clustering operation for a link assessment operation, according to an embodiment. In FIG. 4, a distribution of the noise experienced at various frequencies in block 402 are represented spatially. The distance between two frequencies, e.g., $f_1$ and $f_2$ is denoted $d(f_1,f_2)$. After the distances among the different noise levels for the frequencies is determined, the frequencies are clustered into sets, as shown in block 404, where sets 41, 42, and 43 are formed. The number of sets is determined by a threshold distance value for the frequencies. Thus, if the distance between any two frequencies exceeds the threshold distance value, those two frequencies are clustered into different sets from one another. Likewise, if the distance between two frequencies is less than this threshold distance value, then the two frequencies are clustered in the same set. The binary relation "distance is less than" obeys the transitive property over any set of frequencies, meaning that if $d(f_1,f_2)<d_{th}$, and $d(f_2,f_3)<d_{th}$, then threshold distance). The clustering operation can be performed with respect to the distance values $d(f_1,f_2)$ in relation to the threshold distance $d_{th}$, or with respect to a correlation index $(f_1,f_2)_{corr}$, in relation to a threshold correlation index $corr_{th}$; where in general, $(f_1f_2)_{corr}=1/d(f_1, f_2)$, and $corr_{th}=1/d_{th}$.

As shown in FIG. 4, once the frequencies have been clustered, a representative frequency in each set is then selected, as shown in block 406. In one embodiment, the selected frequency is the middle-most frequency in the set, as denoted by the highlighted frequencies 46, 47, and 48. After the clustering operation has been completed and a frequency has been selected for each set, a link assessment operation is performed over the set of chosen frequencies. The link quality estimates are then extrapolated to all the frequency channels within that group. Thus, as shown in FIG. 4, the link quality for frequency 46 is taken to be the link quality for all frequencies in group 41.

FIG. 3 illustrates an example of frequency correlation based on distance values for a set of hypothetical links in a network, according to an embodiment. For the example of FIG. 3, there a number (X) of nodes 302 communicating on a number (Y) of frequency channels 304. Representative noise values are provided for nodes 1-6 for channels A, B, and C. The distance between frequencies A and B, d(a, b), is the sum of the differences in noise values between the two channels, thus 1+4+3+0+7+2=17. Likewise the distance between frequencies B and C, d(b,c) is 16 and d(a,c) is 7.

With respect to the example of FIG. 3, frequencies A and C are closer together (a lesser distance), and hence more highly correlated to each other than are frequencies A and B, and B and C. If the threshold distance is assigned to be 10, then a link assessment operation would only need to be performed for either of frequency A or C, when both of these channels are available on a link between any two nodes.

The above-described embodiments use the noise correlation across different frequencies at different points in space rather than relying on absolute noise readings. By always correlating frequency channels at the same point, inaccuracies due to RSSI non-linearity are minimized. By averaging data over different points, a reliable estimate of noise correlation between channels is achieved. This information is then used to find the packet success rate for each set of channels.

For the embodiment illustrated in FIG. 2, once the packet success rate estimate for each usable channel has been determined in 212, the nodes periodically perform frequency monitoring on the sets to ensure that the selected frequencies remain the optimum frequency channels for low-energy transmissions, 214. Such periodic frequency monitoring operations can be pre-programmed by the system or initiated upon the triggering of an event and propagated by the base station to the nodes.

In one embodiment a cumulative measure of noise experienced by all nodes on a particular frequency can be calculated before link assessment by the base station, to determine the "best" frequencies of operation. The link assessment process provides further information regarding which frequency is most suitable for use on any link, or the certain areas/zones (links) where it would be preferable to use another frequency. In this manner, better link scheduling can be achieved for functional operation of the network.

To generalize this scheme for any number of frequency channels, the channels are first divided into sets of adjacent channels such that each set of adjacent channels is an order of magnitude less than the coherence bandwidth of the network. Thereafter, the above-described procedure is repeated for clustering the frequencies in each set.

Embodiments of a network link assessment system as described herein can be used in various different applications, industries or industry segments, such as local or wide area networks for sensor devices, or local or wide area networks for computing devices, and the like. The nodes can be simple sensors, or sophisticated computing devices, or combinations thereof. The nodes may be statically placed or they may be movable within defined areas of the network. The links between the nodes may encompass one or more frequency channels, some of which may utilize either hard-wired or wireless communication means.

The network may be a single base station-multiple node network, such as that shown in FIG. 1, or it may be a network that contains multiple base stations, or enhanced capability nodes that can perform operations according to embodiments. The operations of determining the correlation index calculation and frequency clusters can be performed one or more of the base stations (e.g., base station 102) of the network, or they may be performed by one or more of the nodes themselves. The base station may be a self-powered (e.g., battery) station or an externally powered station, and may be tightly or loosely coupled to one or more computing and/or memory systems. The link assessment operation may be performed only once during the lifetime of the network, such as during an initialization phase, or it may be performed periodically, or on an as-needed basis, during the operational lifetime of the network.

Aspects of the link assessment system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects of the link assessment and frequency monitoring method include: microcontrollers with memory (such as EEPROM), embedded microprocessors, firmware, software, etc. Furthermore, aspects of the link assessment method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the sensor network link assessment and frequency monitoring system is not intended to be exhaustive or to limit the embodiments to the precise form or instructions disclosed. While specific embodiments of, and examples for, the link assessment and frequency monitoring system are described herein for illustrative purposes, various equivalent modifications are possible within the scope of the described embodiments, as those skilled in the relevant art will recognize.

The elements and acts of the various embodiments described above can be combined to provide further embodiments. These and other changes can be made to the link assessment and frequency monitor in light of the above detailed description.

In general, in the following claims, the terms used should not be construed to limit the described system to the specific embodiments disclosed in the specification and the claims, but should be construed to include all operations or processes that operate under the claims. Accordingly, the described system is not limited by the disclosure, but instead the scope of the recited method is to be determined entirely by the claims.

While certain aspects of the link assessment and frequency monitor are presented below in certain claim forms, the inventor contemplates the various aspects of the methodology in any number of claim forms. For example, while only one aspect of the link assessment and frequency monitor is recited as embodied in machine-readable medium, other aspects may likewise be embodied in machine-readable medium. Accordingly, the inventors reserve the right to add additional claims after filing the application to pursue such additional claim forms for other aspects of the described system.

What is claimed is:

1. A method of assessing link quality in a network comprising:
   sampling each frequency of a plurality of frequencies utilized by links coupling two or more nodes in the network to determine a noise measure for each frequency;
   determining a correlation index based on a difference of noise measure between each pair of frequencies of the plurality of frequencies;
   dividing the plurality of frequencies into a number of groups of frequencies based on the correlation index between each pair of frequencies, wherein the number of groups is less than the total number of frequencies;
   selecting a representative frequency for each group of frequencies; and
   assessing a link quality for each pair of nodes in the network for the representative frequency of each group of frequencies.

2. The method of claim 1, wherein assessing the link quality comprises determining a packet success rate for the representative frequency of each group of frequencies.

3. The method of claim 2, wherein the packet success rate is calculated over a predetermined number of packets transmitted over a link, and is measured with respect to a signal to interference noise threshold for each node coupled by the link.

4. The method of claim 3, further comprising periodically monitoring the representative frequency of each group of frequencies, and changing a frequency used for transmission between a pair of nodes if more than a pre-determined number of packet re-transmissions are required to communicate data between the pair of nodes.

5. The method of claim 1, wherein the correlation index between any pair of frequencies as determined by a vector distance function.

6. The method of claim 1, wherein the number of groups is determined by a maximum amount of time available to perform a link assessment operation.

7. The method of claim 1, wherein the nodes comprise sensors operated by battery power, and wherein the links comprise wireless communication channels.

8. The method of claim 7, further comprising transmitting the noise measure for each frequency to a base station of the network, and wherein the link assessment is performed during an initialization operation of the network.

9. A method of measuring quality of data transmission among a plurality of nodes in a network, comprising:
   sampling each frequency of a plurality of frequencies utilized by links coupling two or more nodes of the plurality of nodes in the network during a non-data transmission time period of the network to determine a noise measure for each frequency;
   grouping the noise measures for each frequency based on a threshold difference between any pair of frequencies into a number of groups, wherein the number of groups is less than the total number of frequencies;
   selecting a representative frequency for each group of frequencies;
   determining a packet success rate for the representative frequency of each group of frequencies; and
   assigning the packet success rate of the representative frequency to the remaining frequencies within the group including the representative frequency.

10. The method of claim 9, wherein the grouping comprises determining a correlation index between any pair of frequencies as determined by a vector distance function.

11. The method of claim 10, further comprising periodically monitoring the representative frequency of each group of frequencies, and changing a frequency used for transmission between a pair of nodes if more than a pre-determined number of packet re-transmissions are required to communicate data between the pair of nodes.

12. The method of claim 11, wherein the nodes comprise sensors operated by battery power, and wherein the links comprise wireless communication channels.

13. A machine-readable, non-volatile storage medium storing instructions which when executed in a processing system assesses link quality in a network by:
   sampling each frequency of a plurality of frequencies utilized by links coupling two or more nodes in the network to determine a noise measure for each frequency;
   determining a correlation measure between each pair of frequencies of the plurality of frequencies;
   dividing the plurality of frequencies into a number of groups of frequencies based on the correlation measure between each pair of frequencies, wherein the number of groups is less than the total number of frequencies;
   selecting a representative frequency for each group of frequencies; and performing a link assessment operation for each pair of nodes in the network for the representative frequency of each group of frequencies.

14. The medium of claim 13, further comprising instructions for determining a packet success rate for the representative frequency of each group of frequencies.

15. The medium of claim 14, further comprising instructions for monitoring the representative frequency of each group of frequencies, and changing a frequency used for transmission between a pair of nodes if more than a pre-determined number of packet re-transmissions are required to communicate data between the pair of nodes.

16. The medium of claim 15, wherein the correlation measure is a correlation index between any pair of frequencies as determined by a vector distance function, and wherein the number of groups is determined by a maximum amount of time available to perform a link assessment operation.

17. A network comprising:
a plurality of nodes configured to sample each frequency of a plurality of frequencies utilized by links coupling two or more nodes in the network to determine a noise measure for each frequency; and
a base station coupled to the plurality of nodes of the network, and configured to receive the noise measure for each frequency from the plurality of nodes, and to divide the plurality of frequencies into a number of groups of frequencies based on the correlation measure between each pair of frequencies, wherein the number of groups is less than the total number of frequencies;
wherein each of the plurality of nodes is further configured to select a representative frequency for each group of frequencies, and perform a link assessment cycle for each pair of nodes in the network for the representative frequency of each group of frequencies.

18. The network of claim 17, wherein the base station is further configured to determine a packet success rate for the representative frequency of each group of frequencies, and wherein the correlation measure is a correlation index between any pair of frequencies as determined by a vector distance function.

19. The network of claim 18, wherein the nodes comprise sensors operated by battery power, and wherein the links comprise wireless communication channels.

20. The network of claim 19, wherein each node is further configured to periodically monitor the representative frequency of each group of frequencies, and change a frequency used for transmission between a pair of nodes if more than a pre-determined number of packet re-transmissions is required to communicate data between the pair of nodes.

21. The network of claim 20, wherein the number of groups is determined by a maximum amount of time available to perform a link assessment operation.

* * * * *